(12) United States Patent
Satou et al.

(10) Patent No.: US 7,726,433 B2
(45) Date of Patent: Jun. 1, 2010

(54) AIRBAG DEVICE FOR VEHICLE

(75) Inventors: Yoshimitsu Satou, Toyota (JP); Hiroyuki Takahashi, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 229 days.

(21) Appl. No.: 12/083,520

(22) PCT Filed: Oct. 10, 2006

(86) PCT No.: PCT/IB2006/002817

§ 371 (c)(1), (2), (4) Date: Apr. 11, 2008

(87) PCT Pub. No.: WO2007/042908

PCT Pub. Date: Apr. 19, 2007

(65) Prior Publication Data

US 2009/0160170 A1    Jun. 25, 2009

(30) Foreign Application Priority Data

Oct. 11, 2005    (JP)    .............................. 2005-296572

(51) Int. Cl.
  *B60R 21/34*    (2006.01)
(52) U.S. Cl. .................................... 180/274
(58) Field of Classification Search ................ 180/274; 280/728.3; 296/187.04, 193.11, 193.12
  See application file for complete search history.

(56) References Cited

U.S. PATENT DOCUMENTS

| 6,827,170 | B2 |    | 12/2004 | Hamada et al. |
| 6,923,286 | B2 | *  | 8/2005  | Sato et al. ................. 180/274 |
| 7,287,618 | B2 | *  | 10/2007 | Okamoto et al. ............ 180/274 |
| 7,357,212 | B2 | *  | 4/2008  | Sasaki et al. ................ 180/274 |
| 2003/0159875 | A1 | * | 8/2003  | Sato et al. ................... 180/274 |
| 2005/0205333 | A1 |   | 9/2005  | Mori et al. |

(Continued)

FOREIGN PATENT DOCUMENTS

DE    20 2004 001 726 U1    5/2004

(Continued)

OTHER PUBLICATIONS

International Search Report.

(Continued)

*Primary Examiner*—Paul N Dickson
*Assistant Examiner*—Joseph Rocca
(74) *Attorney, Agent, or Firm*—Finnegan, Henderson, Farabow, Garrett & Dunner, LLP (57) ABSTRACT

In a plan view seen from above a vehicle, a cover (20), which closes an airbag deployment opening (14) formed in a hood outer panel (12), is elongate, and has an arc shape. The center portion of the cover (20) in a vehicle-width direction protrudes toward the front of the vehicle. Hinge portions (20E) of the cover (20) are formed in the vehicle rear-side edge of the cover (20) at positions near both end portions in the vehicle-width direction. Each clip (28), which fixes the cover (20), is disposed in a vehicle front-side edge (20J) at a position offset outward from a center portion (20K) in the vehicle-width direction. Thus, the clips (28) are prevented from interfering with an airbag that has passed through the airbag deployment opening (14) and has been deployed.

7 Claims, 8 Drawing Sheets

U.S. PATENT DOCUMENTS

2006/0042854 A1 * 3/2006 Sasaki et al. .............. 180/274
2007/0023222 A1 * 2/2007 Okamoto et al. ............ 180/274

FOREIGN PATENT DOCUMENTS

| EP | 1 300 302 A2 | 4/2003 |
|----|--------------|--------|
| EP | 1 394 001 A1 | 3/2004 |
| JP | 7-125607 | 5/1995 |
| JP | 7-125609 | 5/1995 |
| JP | 2003-104144 | 4/2003 |

OTHER PUBLICATIONS

Written Opinion of the ISR.

* cited by examiner

AIRBAG DEVICE FOR VEHICLE

BACKGROUND OF THE INVENTION

1. Field of the Invention

The invention relates to an airbag device for a vehicle in which an airbag passes through an opening formed in a vehicle-body panel of an engine hood or the like, and is deployed.

2. Description of the Related Art

Japanese Patent Application Publication No. JP-A-7-125609 describes a structure in which an airbag is deployed on the upper surface of an engine hood to protect an impactor at the time of collision. In this structure, an airbag deployment opening is formed in the engine hood that serves as a cover above an engine room provided in the front of a vehicle. A lid covers the opening, and opens/closes the opening.

In the structure described in Japanese Patent Application Publication No. JP-A-7-125609, right and left extended portions are formed near both end portions of a flange that is disposed along the longitudinal direction of the lid. The right and left extended portions are fixed to the side wall of a backup plate. The extended portions serve as hinges when the lid is opened. Thus, when the lid pivots around the left and right hinge axes and is opened, the center portion of the lid in the longitudinal direction may approach the deployed airbag and may interfere with the deployed airbag.

SUMMARY OF THE INVENTION

It is an object of the invention to provide an airbag device for a vehicle that makes it possible to prevent an airbag, which has passed through an opening and has been deployed, from interfering with a holding member such as a clip, which is provided in a covering body fitted to the opening, such as a lid.

A first aspect of the invention relates to an airbag device for a vehicle, which includes an airbag, a covering body, a hinge portion, and a holding means. The airbag passes through an elongate opening formed in a vehicle-body panel, and then is deployed. The covering body, which is elongate, closes the opening. The hinge portion is provided in one peripheral edge of the covering body, which extends along the longitudinal direction of the covering body. The holding means holds the covering body at such a position that the covering body closes the opening. The holding means is disposed in another peripheral edge of the covering body, which extends along the longitudinal direction, and which is opposite to the one peripheral edge in which the hinge portion is provided. The holding means is disposed in an area of the other peripheral edge excluding a center portion and end portions in the longitudinal direction, at least one position between the center portion and at least one of the end portions in the longitudinal direction.

According to the first aspect, when the airbag passes through the opening and is deployed, the elongate covering body, which closes the elongate opening formed in the vehicle-body panel, pivots around the hinge portion provided in the one peripheral edge of the covering body, which extends along the longitudinal direction. At this time, the holding means, which holds the covering body at such a position that the covering body closes the opening, is provided in the other peripheral edge of the covering body, which extends along the longitudinal direction, and which is opposite to the one peripheral edge in which the hinge portion is provided. The holding means is disposed in the area of the other peripheral edge excluding the center portion and end portions in the longitudinal direction, at least one position between the center portion and at least one of the end portions in the longitudinal direction. The distance between the airbag that is deployed and the center portion is short.

Thus, in the airbag device for a vehicle according to the first aspect, it is possible to prevent the airbag, which has passed through the opening and has been deployed, from interfering with the holding means provided in the covering body.

A second aspect of the invention relates to an airbag device for a vehicle, which includes an airbag, a covering body, a hinge portion, and a holding means. The airbag passes through an elongate opening formed in a vehicle-body panel, and then is deployed. The covering body, which is elongate, closes the opening. The hinge portion is provided in one peripheral edge of the covering body, which extends along the longitudinal direction of the covering body. The holding means holds the covering body at such a position that the covering body closes the opening. The holding means is disposed in another peripheral edge of the covering body, which extends along the longitudinal direction, and which is opposite to the one peripheral edge in which the hinge portion is provided. The holding means is disposed at a position distant from an airbag approach portion of the covering body. The distance between the airbag that is deployed and the airbag approach portion is shorter than the distance between the airbag that is deployed and any other portion of the covering body in the longitudinal direction, when the covering body pivots around the hinge portion.

According to the second aspect, when the airbag passes through the opening and then is deployed, the elongate covering body, which closes the elongate opening formed in the vehicle-body panel, pivots around the hinge portion provided in the one peripheral edge that extends along the longitudinal direction. At this time, the holding means, which holds the covering body at such a position that the covering body closes the opening, is provided in the other peripheral edge of the covering body, which extends along the longitudinal direction, and which is opposite to the one peripheral edge in which the hinge portion is provided. The holding means is disposed at the position distant from the airbag approach portion of the covering body. The distance between the airbag that is deployed and the airbag approach portion is shorter than the distance between the airbag that is deployed and any other portion of the covering body in the longitudinal direction.

Thus, in the airbag device for a vehicle according to the second aspect, it is possible to prevent the airbag, which has passed through the opening and has been deployed, from interfering with the holding means provided in the covering body.

In the airbag device for a vehicle according to the second aspect, the pivot center axes of a plurality of the hinge portions may not be positioned on one axis, and the pivot center axes may cross each other. The airbag approach portion may be a portion that is deformed due to a difference between pivot trajectories of the other peripheral edge of the covering body, which extends along the longitudinal direction.

According to the above-described aspect, when the airbag passes through the opening and is deployed, the elongate covering body, which closes the elongate opening formed in the vehicle-body panel, pivots around the hinge portion provided in the one peripheral edge of the covering body, which extends along the longitudinal direction. At this time, the pivot center axes of the plurality of the hinge portions are not positioned on one axis, and the pivot center axes cross each other. The holding means, which holds the covering body at such a position that the covering body closes the opening, is provided at the position distant from the portion deformed due to the difference between the pivot trajectories of the other peripheral edge of the covering body, which extends in the longitudinal direction, and which is opposite to the one peripheral edge in which the hinge portions are provided.

Thus, in the airbag device for a vehicle according to the above-described aspect, it is possible to prevent the airbag, which has passed through the opening and has been deployed, from interfering with the holding means provided at the position distant from the portion deformed due to the difference between the pivot trajectories of the other peripheral edge of the covering body, which is opposite to the one peripheral edge.

In the above-described aspect, the one peripheral edge, which extends in the longitudinal direction, may be bent to have an arc shape or a V-shape.

In the airbag device for a vehicle according to the first or second aspect, the airbag approach portion may be the center portion of the other peripheral edge of the covering body in the longitudinal direction.

According to the above-described aspect, when the airbag passes through the opening and is deployed, the elongate covering body, which closes the elongate opening formed in the vehicle-body panel, pivots around the hinge portion provided in the one peripheral edge of the covering body, which has an arc shape, and which extends along the longitudinal direction. At this time, the holding means, which holds the covering body at such a position that the covering body closes the opening, is provided at the position distant from the center portion of the other peripheral edge of the covering body in the longitudinal direction. The other peripheral edge extends along the longitudinal direction of the covering body, and is opposite to the peripheral edge in which the hinge portions are provided.

Thus, in the airbag device for a vehicle according to the above-described aspect, it is possible to prevent the airbag, which has passed through the opening and has been deployed, from interfering with the holding means provided at the position distant from the center portion of the other peripheral edge of the covering body in the longitudinal direction. The other peripheral edge is opposite to the one peripheral edge having an arc shape.

In the airbag device for a vehicle according to the above-described aspect, the pivot center axes of the hinge portions may extend along the longitudinal directions of the opening and the covering body at both end portions in a vehicle-width direction. Each of the pivot center axes may incline such that the outer portion of each of the pivot center axes in the vehicle-width direction is closer to the rear of a vehicle than the inner portion of each of the pivot center axes in the vehicle-width direction is.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein.

DETAILED DESCRIPTION OF THE EXAMPLE EMBODIMENTS

An airbag device for a vehicle according to an embodiment of the invention will be described with reference to FIG. 1 to FIG. 7. In FIG. 1 to FIG. 7, an arrow UP indicates the top of the vehicle, and an arrow FR indicates the front of a vehicle.

Figure 2:
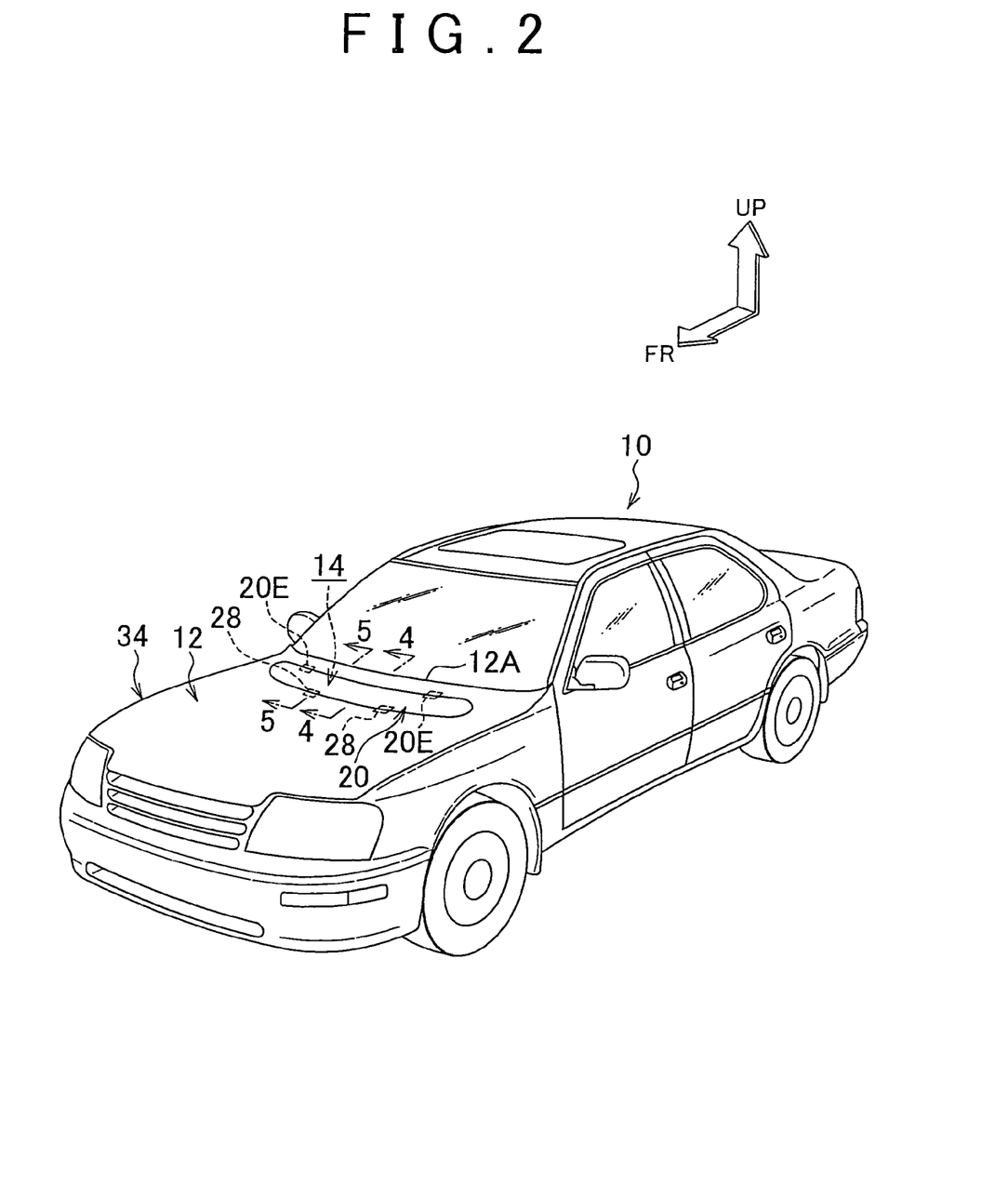
FIG. 2 is a perspective view showing a vehicle body to which the airbag device for a vehicle according to the embodiment of the invention is applied, and which is obliquely seen from ahead of the vehicle body.
Figure 3:
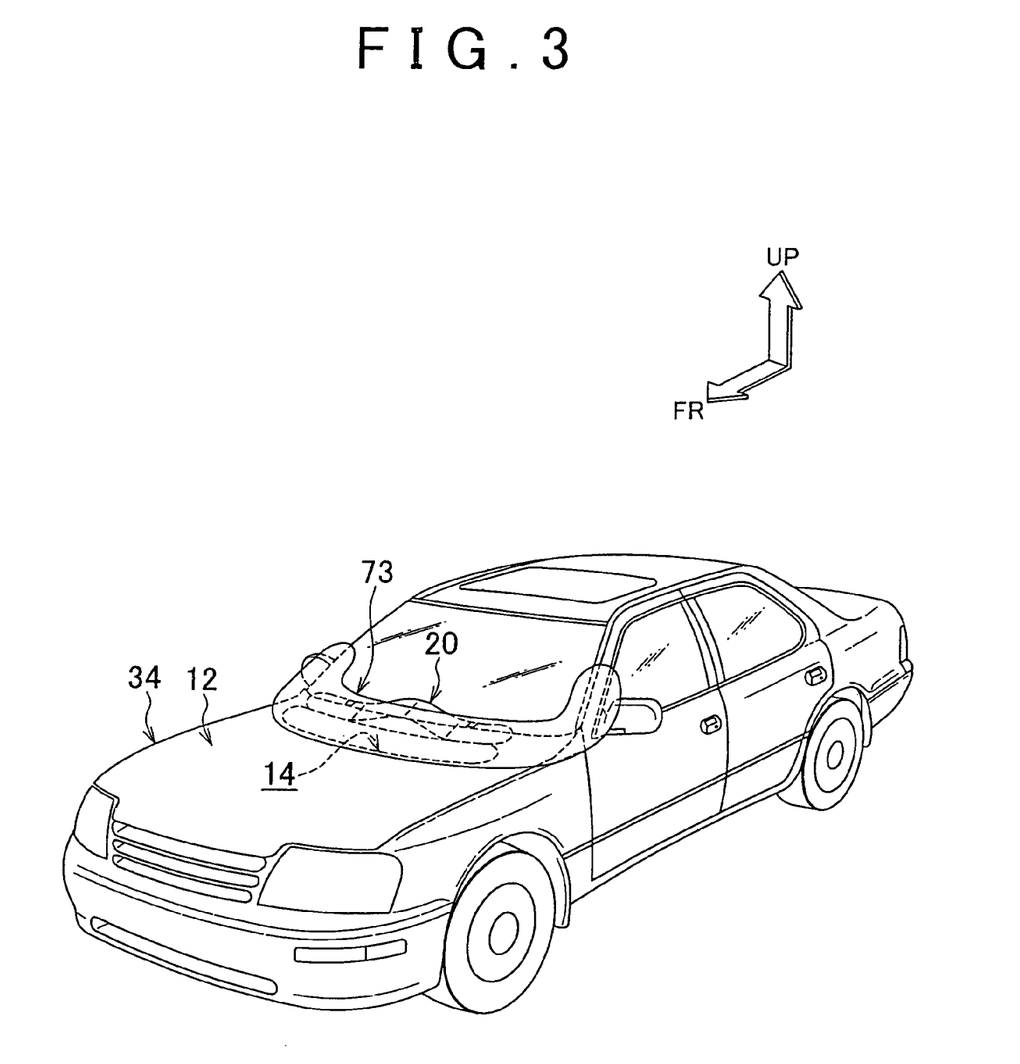
FIG. 3 is a perspective view showing that the airbag is deployed in the vehicle body to which the airbag device according to the embodiment of the invention is applied, which is obliquely seen from ahead of the vehicle body.

As shown in FIG. 2, an engine hood outer panel (hereinafter, simply referred to as "hood outer panel") 12 is disposed on the upper surface of the front portion of the body of an automobile (hereinafter, referred to as "vehicle body") 10 in the embodiment. The hood outer panel 12 is made of metal plate, which is a vehicle-body panel that forms the periphery of the vehicle body 10 (vehicle-body outer panel). An airbag deployment opening 14 is formed ahead of, and near the rear edge 12A of the hood outer panel 12.

Figure 1:
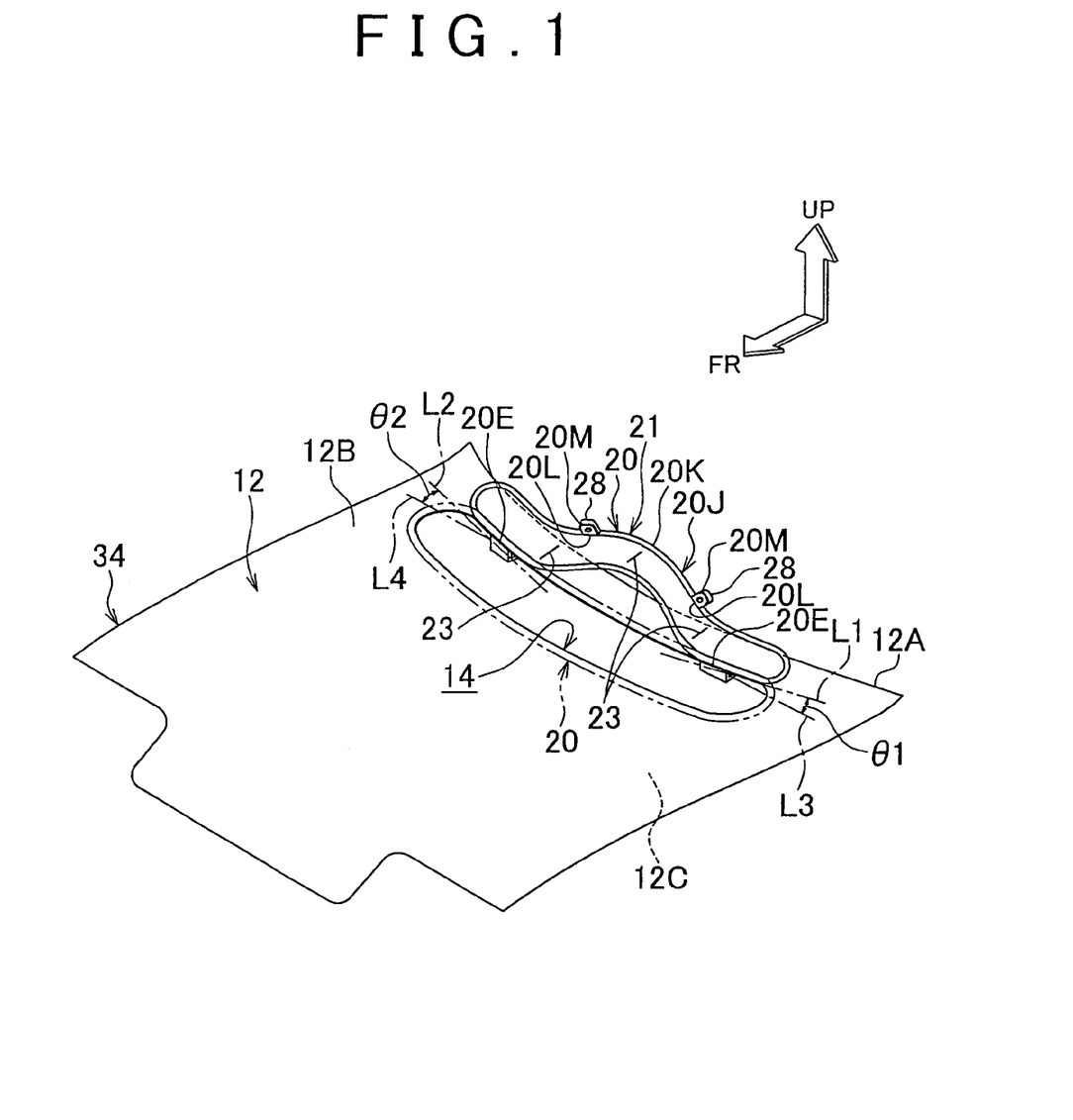
FIG. 1 is a perspective view showing the hood panel of an airbag device for a vehicle according to an embodiment of the invention, which is obliquely seen from ahead of a vehicle body.

As shown in FIG. 1, the airbag deployment opening 14 extends in a vehicle-width direction. That is, the longitudinal direction of the airbag deployment opening 14 matches the vehicle-width direction. In a plan view seen from above the vehicle, the airbag deployment opening 14 extends in the vehicle-width direction along the rear edge 12A. The airbag deployment opening 14 is elongate, and has an arc shape. That is, the center portion of the airbag deployment opening 14 in the vehicle-width direction protrudes toward the front of the vehicle.

Figure 4:
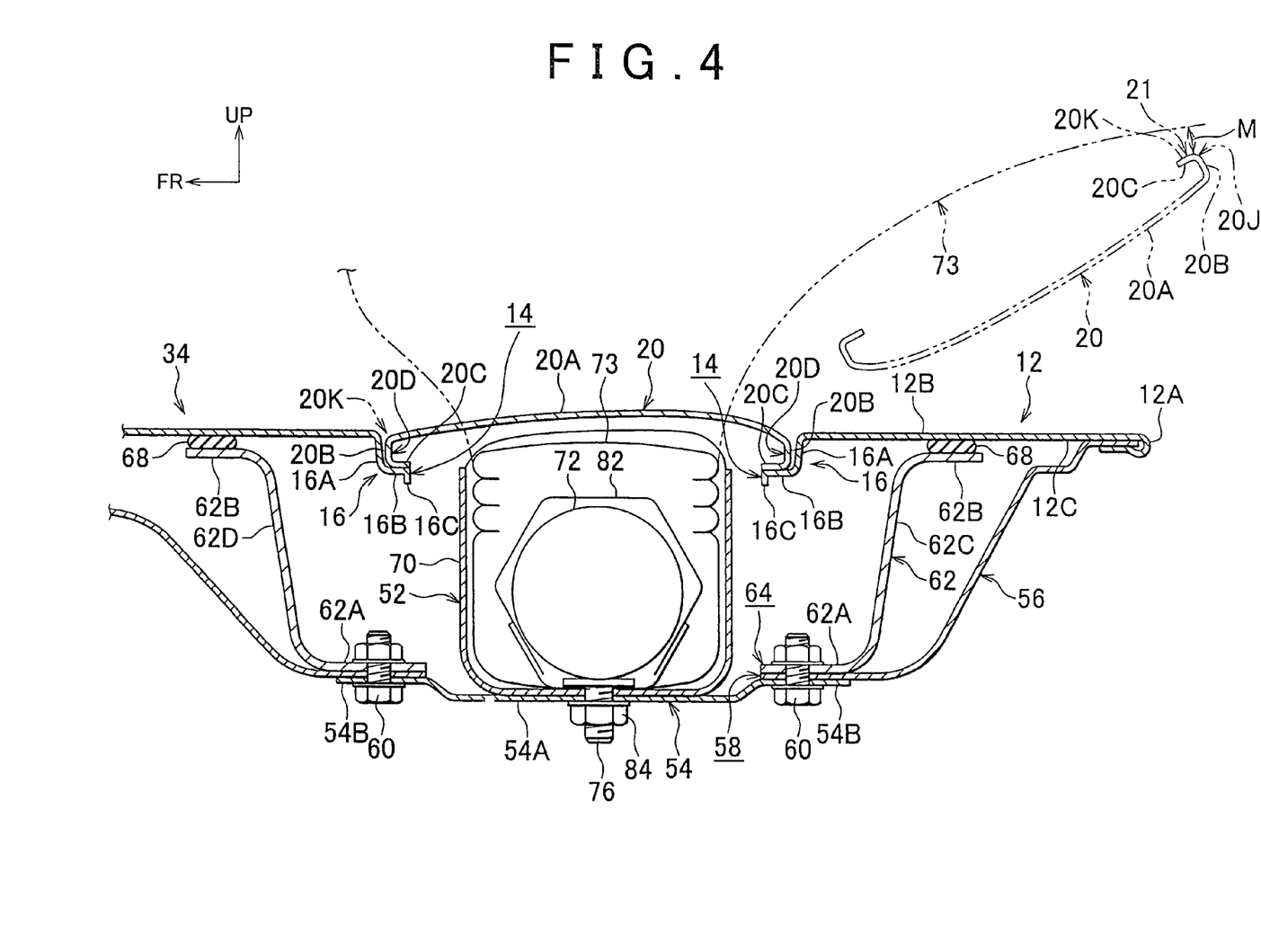
FIG. 4 is an enlarged sectional view taken along line 4-4 of FIG. 2.

As shown in FIG. 4, a shelf portion 16 is formed in a circumferential direction to surround the airbag deployment opening 14 in the hood outer panel 12. When the hood is closed, the shelf portion 16 is dented toward the bottom of the vehicle. The shelf portion 16 is formed by a pressing process or the like. The shelf portion 16 includes a vertical wall 16A, a horizontal plate 16B and a flange 16C. The vertical wall 16A bends from a base portion 12B that forms the designed surface of the hood outer panel 12, toward the bottom of the vehicle. The horizontal plate 16B bends at a right angle from the lower end portion of the vertical wall 16A toward the inner side of the airbag deployment opening 14. The flange 16C bends from the inner end portion of the horizontal plate 16B toward the bottom of the vehicle.

As shown in FIG. 2, a cover 20, which serves as a covering body, is fitted to the airbag deployment opening 14 in the hood outer panel 12. In a plan view seen from above the vehicle, the cover 20 is elongate, and has an arc shape. The cover 20 extends along the rear edge 12A of the hood outer panel 12. The center portion of the cover 20 in the vehicle-width direction protrudes toward the front of the vehicle. The cover 20 closes the entire airbag deployment opening 14.

As shown in FIG. 4, the thickness of the cover 20 is substantially the same as that of the hood outer panel 12. The cover 20 is made of metal plate.

A vertical wall 20B is formed so as to bend from the peripheral edge of a base portion 20A that forms the designed surface of the cover 20, toward the bottom of the vehicle, when the hood is closed. A lower plate 20C is formed to bend at a right angle from the lower end portion of the vertical wall 20B, toward the inner side of the airbag deployment opening 14. A concave portion 20D is formed in the peripheral-edge lower portion of the cover 20 by the peripheral edge of the base portion 20A, the vertical wall 20B, and the lower plate 20C. The lower plate 20C of the cover 20 is placed on the horizontal plate 16B of the shelf portion 16 that is formed to surround the airbag deployment opening 14 in the hood outer panel 12.

As shown in FIG. 1, hinge portions 20E are formed in the vehicle rear-side edge of the cover 20 at positions near both end portions in the vehicle-width direction. The vehicle rear-side edge is one of the peripheral edges of the cover 20, which extends along the longitudinal direction.

Figure 5:
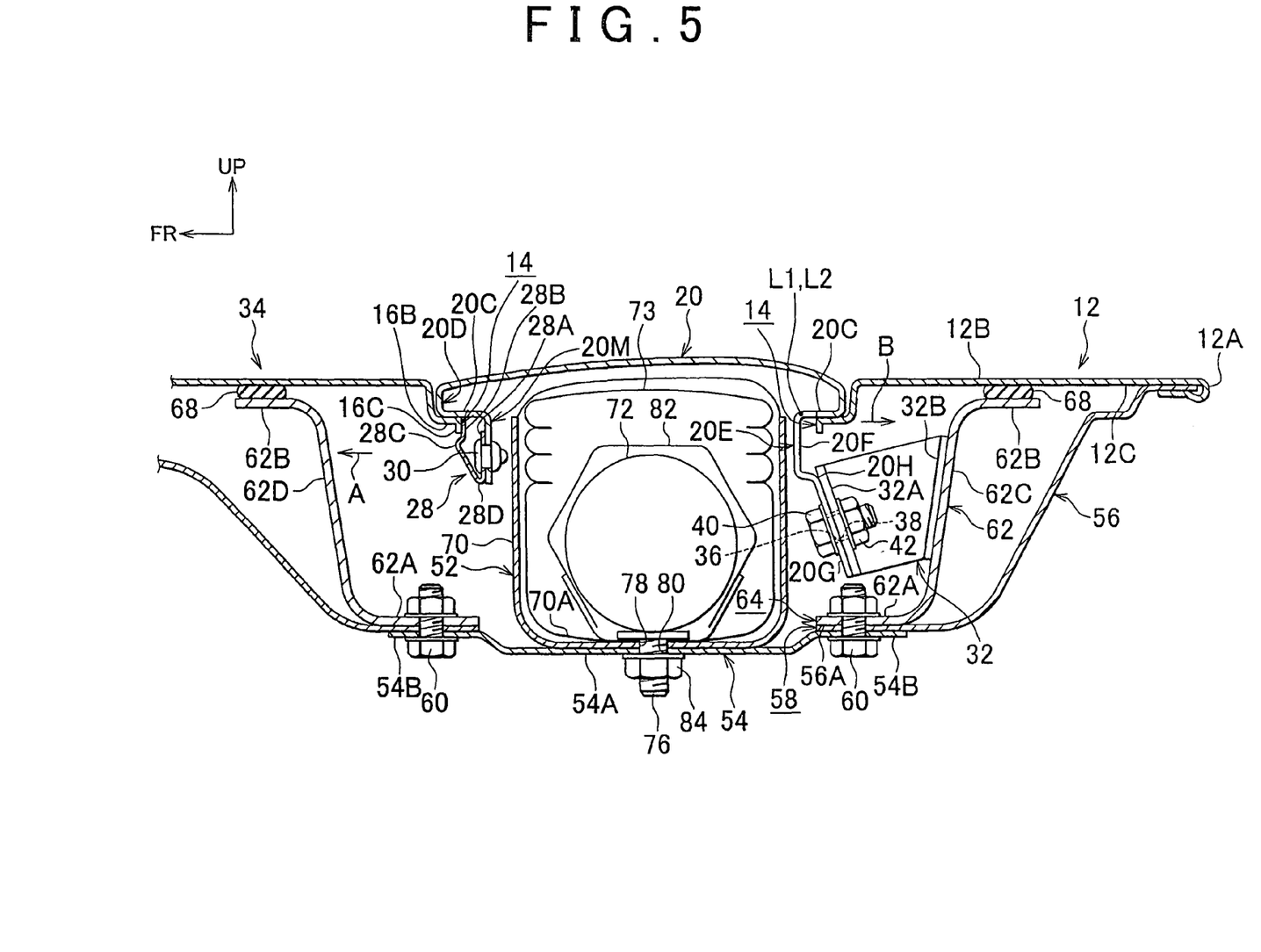
FIG. 5 is an enlarged sectional view taken along line 5-5 of FIG. 2.

As shown in FIG. 5, each hinge portion 20E of the cover 20 is formed integrally with the end portion of the lower plate 20C, and extends toward the bottom of the vehicle. The upper portion 20F of the hinge portion 20E has a side section (i.e., a vertical section along the fore-and-aft direction of the vehicle) that protrudes toward the front of the vehicle. In the side section, the vehicle rear-side portion of the upper portion 20F is open. That is, the upper portion 20F has a rectangular frame-shaped side section. The lower portion 20G of the hinge portion 20E extends from the lower rear end 20H of the upper portion 20F toward the rear-bottom of the vehicle. The lower portion 20G is fixed to an inner reinforcement (described later) 62 by a bracket 32. The lower portion 20G is fixed to a hood 34 via the inner reinforcement.

A through-hole 36 is formed in the lower portion 20G of the hinge portion 20E. The lower portion 20O of the hinge portion 20E overlaps with the cover attachment portion 32A of the bracket 32. A through-hole 38 is formed in the cover attachment portion 32A. A bolt 40 is inserted in the through-holes 36 and 38. The bolt 40 is screwed into a nut 42 that is disposed on the rear surface of the cover attachment portion 32A of the bracket 32.

Accordingly, when an airbag 73 is deployed, the upper portions 20F of the right and left hinge portions 20E are elastically or plastically deformed as shown in FIG. 1. Thus, the cover 20 is opened upward as shown by a two-dot chain line in FIG. 4.

Figure 6:
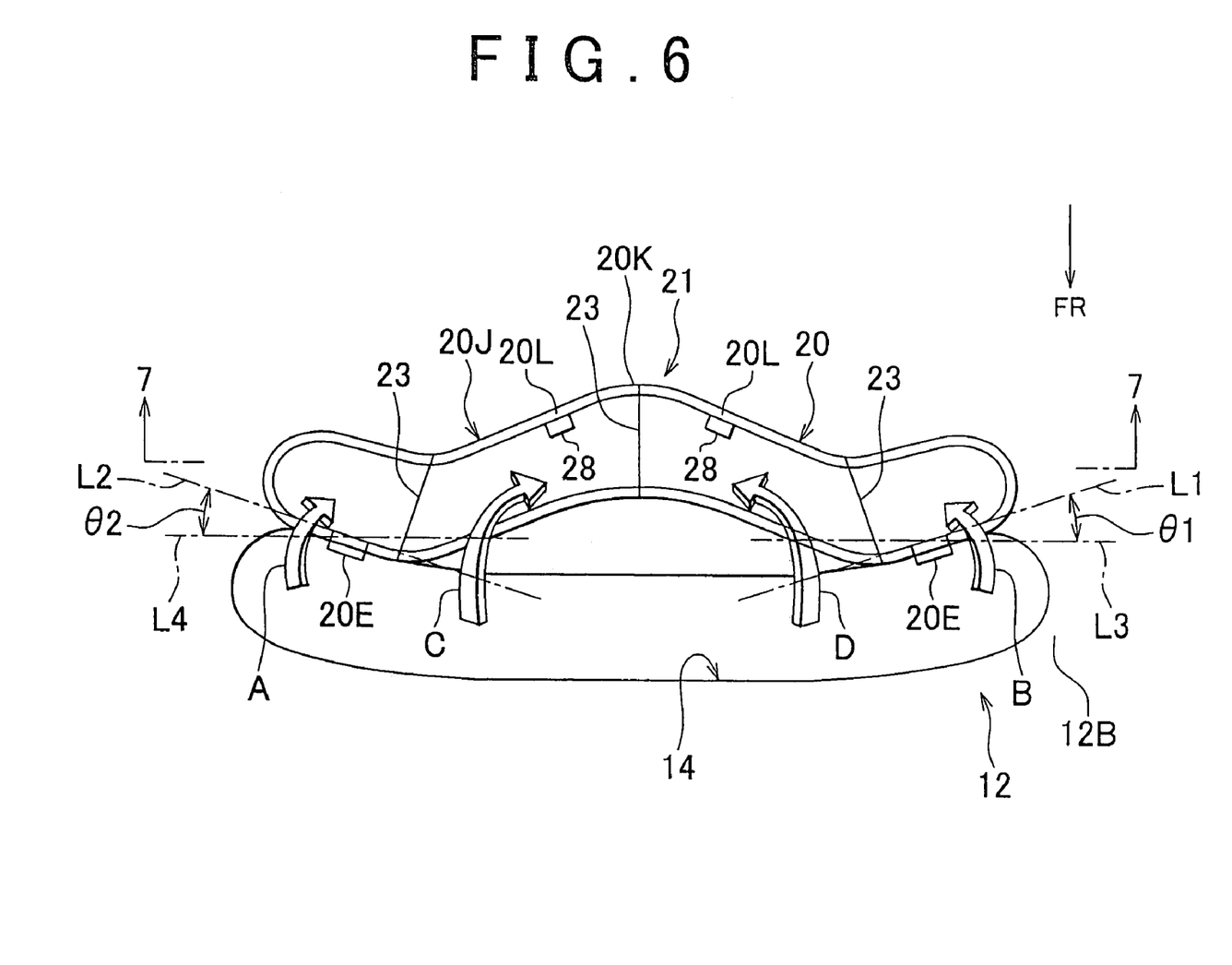
FIG. 6 is a plan view showing the opened cover of the airbag device for a vehicle according to the embodiment of the invention.
Figure 7:
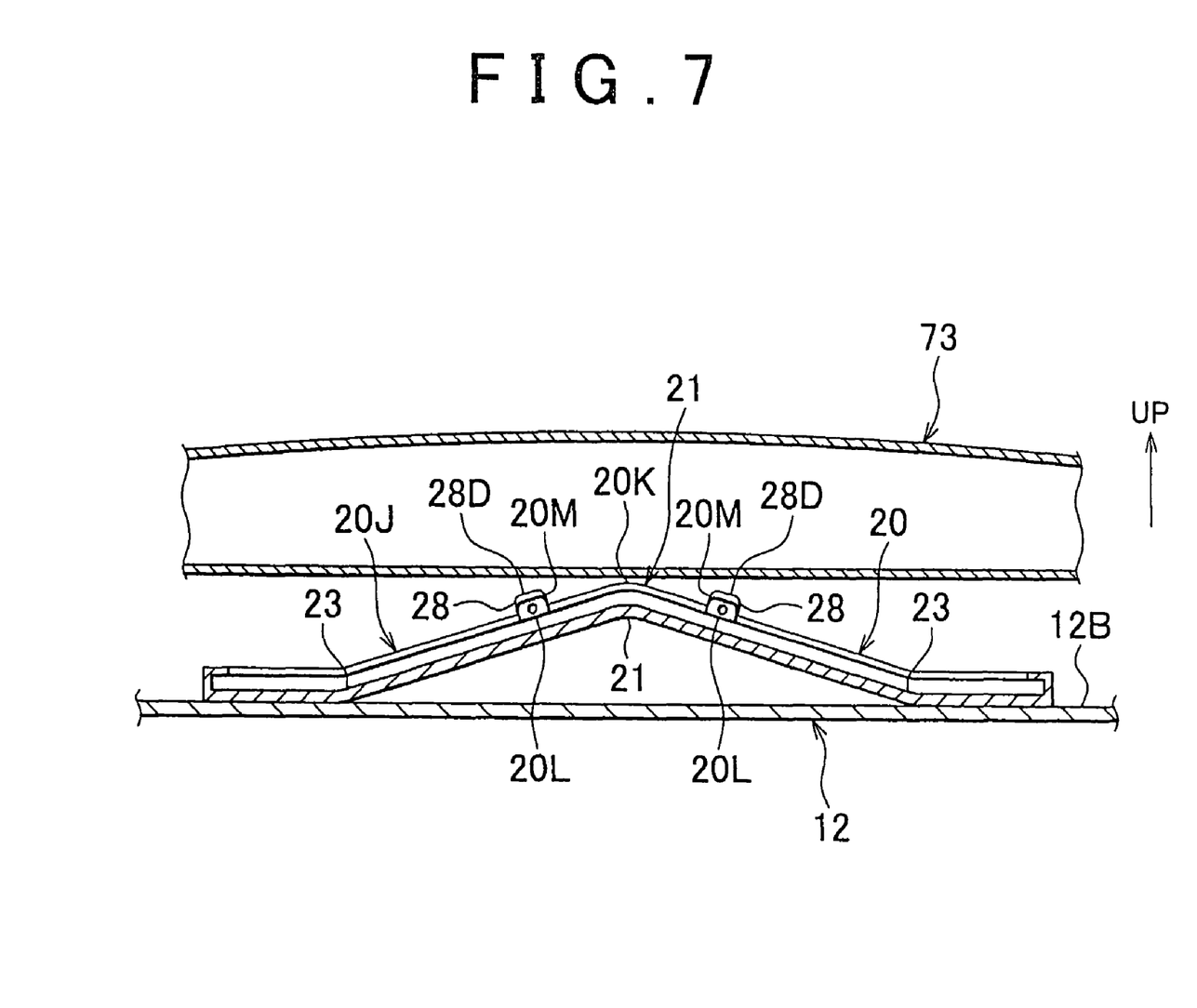
FIG. 7 is a sectional view taken along line 7-7 of FIG. 6.

It is necessary to prevent the both end portions of the cover 20 in the vehicle-width direction from falling into the airbag deployment opening 14 when the cover 20 is opened, as shown in FIG. 7. Thus, as shown in FIG. 6, the hinge axis L1 of the right hinge portion 20E and the hinge axis L2 of the left hinge portion 20E extend along the longitudinal directions (i.e., the tangent-line directions) of the airbag deployment opening 14 and the cover 20 at the positions near the both end portions in the vehicle-width direction. The hinge axes L1 and L2 are not positioned on one axis (one straight line). The hinge axes L1 and L2 cross each other. That is, the right and left hinge axes L1 and L2 symmetrically incline at predetermined angles θ1 and θ2 (θ1=θ2) with respect to lines L3 and L4, respectively. The lines L3 and L4 extend in the vehicle-width direction. The vehicle-width outer portion of each of the hinge axes L1 and L2 is closer to the rear of the vehicle than the vehicle-width inner portion of each of the hinge axes L1 and L2 is.

The phrase "the right and left hinge axes L1 and L2 are not positioned on one axis (one straight line). The hinge axes L1 and L2 cross each other." signifies that lines extending from the right and left hinge axes L1 and L2 cross each other, or that the lines extending from the right and left hinge axes L1 and L2 three-dimensionally cross each other.

Accordingly, when the cover 20 is opened, the both end portions of the cover 20 in the vehicle-width direction pivot around the right and left hinge axes L1 and L2 (as shown by arrows A and B in FIG. 6). Therefore, the center portion of the cover 20 in the longitudinal direction cannot smoothly pivot around the hinge axes L1 and L2 (as shown by arrows C and D in FIG. 6) due to the difference between the pivot trajectories around the hinge axes L1 and L2. As a result, deformation force is applied to the center portion of the cover 20 in the vehicle-width direction. Thus, as shown in FIG. 7, the cover 20 is bent, for example, at three bent portions 23, that are, two portions inside of, and near the right and left hinge portions 20E in the vehicle-width direction, and the center portion in the longitudinal direction. The center portion of the cover 20 in the longitudinal direction is deformed toward the top of the vehicle. The portions inside of, and near the right and left hinge portions 20E in the vehicle-width direction are deformed toward the bottom of the vehicle. The center portion of the vehicle front-side edge 20J of the cover 20 in the longitudinal direction, which is deformed due to the difference between the pivot trajectories, is referred to as "airbag approach portion 21". The distance between the airbag 73, which passes through the airbag deployment opening 14 and is deployed, and the airbag approach portion 21 is shorter than the distance between the airbag 73 and any other portion of the cover 20 in the longitudinal direction.

As shown in FIG. 6 and FIG. 7, after the cover 20 is opened, the distance between the airbag 73, which has passed through the airbag deployment opening 14 and has been deployed, and the center portion of the cover 20 in the longitudinal direction is shorter than the distance between the airbag and any other portion of the cover 20 in the longitudinal direction.

As shown in FIG. 1, clip attachment portions 20M are formed at positions 20L in the vehicle front-side edge 20J. Each of the positions 20L is offset outward from the airbag approach portion 21 in the vehicle-width direction by a predetermined distance. Clips 28, which serve as holding means, are disposed at the clip attachment portions 20M.

As shown in FIG. 5, each of the clip attachment portions 20M of the cover 20 is formed integrally with the end portion of the lower plate 20C so as to extend toward the bottom of the vehicle. The base end portion 28A of the clip 28 is fixed to the lower end portion of each clip attachment portion 20M of the cover 20 by a rivet 30. The clip 28 is made of metal. The clip 28 has a substantially V-shaped side section (i.e., a substantially V-shaped vertical section along the fore-and-aft direction of the vehicle) (refer to FIG. 8).

A through-hole 29 is formed in the base end portion 28A of the clip 28. The through-hole 29 is used to fix the rivet 30.

As shown in FIG. 1, the two right and left clips 28 are provided. Each clip 28 is fixed at the position 20L in the vehicle front-side edge 20J. Each of the positions 20L is offset outward from the airbag approach portion 21 in the vehicle-width direction by a predetermined distance.

Each of the positions 20L, which is offset outward from the airbag approach portion 21 in the vehicle-width direction by the predetermined distance, is the position at which the lower end portion 28D of the clip 28 when the cover 20 is closed (as shown in FIG. 5) does not become higher than the airbag approach portion 21 when the cover 20 is opened as shown in FIG. 7. That is, when the cover 20 is opened, the distance between the airbag 73 and each of the positions 20L is longer than the distance between the airbag 73 and the airbag approach portion 21.

Although the clips 28 in the vehicle rear-side edge of the cover 20 are not shown in FIG. 1 and FIG. 5, the clips 28 are disposed also in the vehicle rear-side edge of the cover 20 at appropriate positions in the vehicle-width direction (i.e., in the longitudinal direction of the cover 20), as well as in the vehicle front-side edge of the cover 20.

Figure 8:
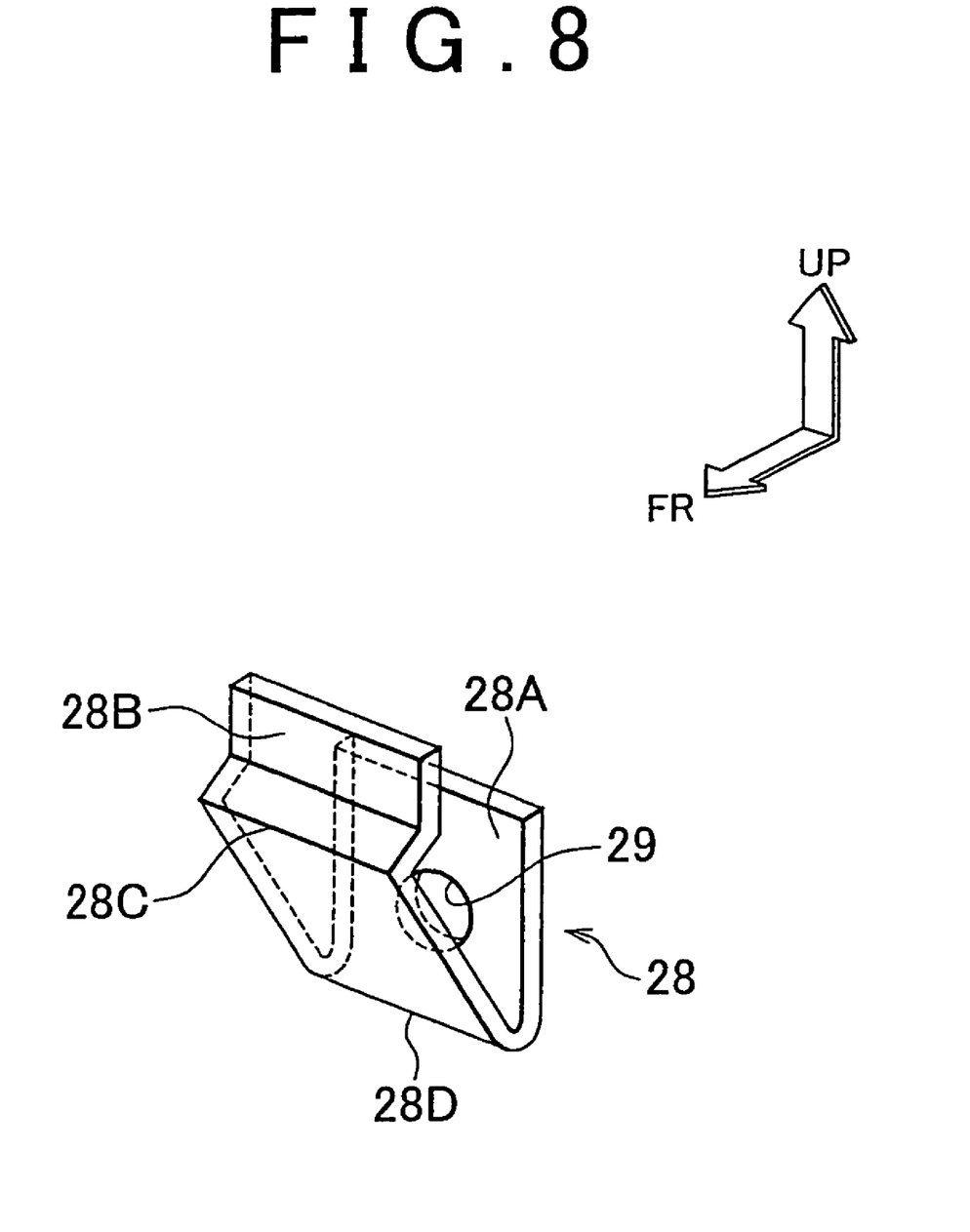
FIG. 8 is a perspective view showing the clips of the airbag device for a vehicle according to the embodiment of the invention, which is obliquely seen from ahead of the vehicle.

As shown in FIG. 8, the clip 28 is formed by bending a leaf spring that has a band shape. The end portion 28B of the clip 28 has a side section (i.e., a vertical section along the fore-and-aft direction of the vehicle) that is bent into a hook. As shown in FIG. 5, the end portion 28B is elastically deformed, and engaged with the flange 16C of the shelf portion 16 of the hood outer panel 12. Thus, the cover 20 is fitted to the airbag deployment opening 14 in the hood outer panel 12.

As shown in FIG. 8, a bent portion 28C is formed below the end portion 28B in the clip 28. The berit portion 28C has a triangle side section (i.e., a vertical section along the fore-and-aft direction of the vehicle) that protrudes toward the front of the vehicle. As shown in FIG. 5, the bent portion 28C contacts the lower end portion of the flange 16C. The flange 16C of the shelf portion 16 is held between the bent portion 28C of the clip 28 and the lower plate 20C of the cover 20 in the vertical direction.

Further, because the end portion 28B of each of the clips 28 fitted in the vehicle front-side edge of the cover 20 is elastically deformed, the reaction force toward the front of the vehicle (i.e., in the direction shown by an arrow A in FIG. 5) is applied to the flange 16C of the shelf portion 16 due to the elastic deformation. Also, because the end portion 28B of each of the clips 28 (not shown) fitted in the vehicle rear-side edge of the cover 20 is elastically deformed, the reaction force toward the rear of the vehicle (i.e., in the direction shown by an arrow B in FIG. 5) is applied to the flange 16C of the shelf portion 16 due to the elastic deformation. As a result, the cover 20 is positioned and fixed on the airbag deployment opening 14 of the hood outer panel 12 by the reaction force toward the front of the vehicle and the reaction force toward the rear of the vehicle.

When the airbag 73 is deployed, the cover 20 is pressed toward the top of the vehicle by the airbag 73. As a result, the clips 28 are disengaged from the airbag deployment opening 14. The hinge portions 20E are deformed when the hinge portions 20E pivot around the hinge axes L1 and L2. Thus, the cover 20 is opened upward as shown by the two-dot chain line in FIG. 4.

As shown in FIG. 5, an airbag device body 52 is fixed on the upper surface of the center portion 54A of an attachment bracket 54 in the fore-and-aft direction. The both end portions 54B of the attachment bracket 54 in the fore-and-aft direction are fixed to the lower surface of the peripheral edge 56A of an opening 58 formed in a hood inner panel 56 by fastening members 60 such as bolts and nuts. The peripheral edge 56A of the opening 58 in the hood inner panel 56 is reinforced by the inner reinforcement 62. The inner reinforcement 62 extends in the vehicle-width direction. That is, the longitudinal direction of the inner reinforcement 62 matches the vehicle-width direction. The inner reinforcement 62 has a hat-shaped section that is opened upward when seen along the vehicle-width direction. An opening 64 is formed in the lower plate 62A of the inner reinforcement 62. The airbag device body 52 is inserted through the opening 64. The attachment bracket 54 is fastened to the peripheral edge of the opening 64 in the lower plate 62A of the inner reinforcement 62 by the fastening members 60. A flange 62B is formed in the upper end portion of the inner reinforcement 62. The flange 62B is fixed to the lower surface 12C of the base portion 12B of the hood outer panel 12 by adhesive agent 68. Vertical walls 62C and 62D connect the lower plate 62A and the flange 62B in the inner reinforcement 62. The front surface of the vertical wall 62C on the rear side is connected to the attachment flange 32B of the bracket 32 by welding or the like.

An airbag case 70 in the airbag device body 52 has a box shape. An inflator 72 having a substantially columnar shape is housed inside the airbag case 70. The axial direction of the inflator 72 matches a hood-width direction (i.e., the vehicle-width direction). Also, the airbag 73 in a folded state is housed inside the airbag case 70. For example, squib, ignition agent, inflammation agent, gas-generation agent, coolant, a filter, and the like are housed in the inflator 72. A plurality of gas-injection holes are formed in the peripheral wall of the inflator 72. Gas is injected through the plurality of the gas-injection holes. Further, attachment bolts 76 are disposed on the outer periphery of the inflator 72 at a plurality of positions (for example, two positions) in the axial direction. The attachment bolts 76 serve as fastening members. The attachment bolts 76 extend in the radial direction of the inflator 72. That is, the axial direction of the attachment bolts 76 matches the radial direction of the inflator 72. Accordingly, bolt-insertion holes 78 and 80 are formed in the bottom wall 70A of the airbag case 70 and the attachment bracket 54. The attachment bolts 76 are inserted through the bolt-insertion holes 78 and 80. While the inflator 72 is supported by the attachment bracket 82, the attachment bolts 76 are inserted through the bolt-insertion holes 78 and 80, and nuts 84 on the lower surface of the attachment bracket 54 are fastened. Thus, the inflator 72 is strongly fixed to the attachment bracket 54. The airbag 73 is folded around the inflator 72 such that the gas injected through the gas-injection holes of the inflator 72 flows into the airbag 73. The airbag 73 in a folded state is housed in the airbag case 70.

Next, the effects obtained in the embodiment will be described.

In the embodiment, when the airbag device body 52 operates and the airbag 73 is deployed at the time of vehicle collision, the cover 20 is pressed toward the top of the vehicle by the airbag 73. Thus, the clips 28, which fix the cover 20 on the airbag deployment opening 14 in the hood outer panel 12, are disengaged, and the cover 20 pivots around the hinge portions 20E that are disposed near the both end portions of the vehicle rear-side edge of the cover 20 in the vehicle-width direction. Thus, the cover 20 is opened. As a result, the airbag 73 passes through the airbag deployment opening 14 and is deployed toward the outside of the vehicle, as shown by the two-dot chain line in FIG. 4.

At this time, as shown in FIG. 6, the hinge axis L1 of the right hinge portion 20E and the hinge axis L2 of the left hinge portion 20E extend along the longitudinal directions (i.e., the tangent-line directions) of the airbag deployment opening 14 and the cover 20 at the positions near the both end portions in the vehicle-width direction. The right and left hinge axes L1 and L2 symmetrically incline at the predetermined angles θ1 and θ2 (θ1=θ2) with respect to the lines L3 and L4, respectively. The lines L3 and L4 extend in the vehicle-width direction. The vehicle-width outer portion of each of the hinge axes L1 and L2 is closer to the rear of the vehicle than the vehicle-width inner portion of each of the hinge axes L1 and L2 is.

As a result, because the cover 20 pivots around the hinge axes L1 and L2, the both end portions of the cover 20 in the vehicle-width direction can be prevented from falling into the airbag deployment opening 14 to a large extent, as shown in FIG. 6 and FIG. 7. Thus, it is possible to prevent the cover 20 from interfering with the deployment of the airbag 73.

When the cover 20 is deployed, the both end portions of the cover 20 in the vehicle-width direction pivot around the right and left hinge axes L1 and L2 (as shown by the arrows A and B in FIG. 6). Therefore, the center portion of the cover 20 in the longitudinal direction cannot smoothly pivot around the hinge axes L1 and L2 (as shown by the arrows C and D in FIG. 6). As a result, deformation force is applied to the center portion of the cover 20 in the vehicle-width direction. Thus, as shown in FIG. 7, the cover 20 is bent, for example, at three bent portions 23, that are, two portions inside of, and near the right and left hinge portions 20E in the vehicle-width direction, and the center portion in the longitudinal direction. The center portion of the cover 20 in the longitudinal direction is deformed toward the top of the vehicle. The portions inside of, and near the right and left hinge portions 20E in the vehicle-width direction are deformed toward the bottom of the vehicle. The center portion of the vehicle front-side edge 20J of the cover 20 in the longitudinal direction is referred to as "the airbag approach portion 21". The distance between the airbag 73, which passes through the airbag deployment opening 14 and is being deployed, and the airbag approach portion 21 is shorter than the distance between the airbag 73 and any other portion of the cover 20 in the longitudinal direction.

As shown in FIG. 6 and FIG. 7, after the cover 20 is opened, the distance between the airbag 73, which has passed through the airbag deployment opening 14 and has been deployed, and the center portion of the cover 20 in the longitudinal direction is shorter than the distance between the airbag and any other portion of the cover 20 in the longitudinal direction.

In the embodiment, the clips 28 are fitted at the positions 20L in the vehicle front-side edge 20J. Each of the positions 20L is offset outward from the airbag approach portion 21 in the vehicle-width direction by the predetermined distance.

Accordingly, it is possible to prevent the clips 28 from further reducing the distance between the airbag 73, which is being deployed or has been deployed, and the center portion 20K of the vehicle front-side edge 20J of the cover 20. As a result, in the embodiment, it is possible to prevent the clips 28 from interfering with the airbag 73.

The particular embodiment of the invention has been described in detail. However, the invention is not limited to the embodiment. It is evident to persons skilled in the art that the invention can be realized in various embodiments without departing from the true spirit of the invention. For example, in the above-described embodiment, in the plan view seen from above the vehicle, each of the airbag deployment opening 14 and the cover 20 extends along the rear edge 12A of the hood outer panel 12, and has an arc shape that protrudes toward the front of the vehicle. However, the shape of the airbag deployment opening 14 and the cover 20 in the plan view seen from above the vehicle is not limited to the arc shape. The airbag deployment opening 14 and the cover 20 may have other shapes, such as a V-shape in the plan view seen from above the vehicle, as long as the cover 20 has the airbag approach portion 21 and the distance between the airbag 73 and the airbag approach portion 21 is shorter than the distance between the airbag 73 and any other portion of the cover 20 in the longitudinal direction when the cover 20 pivots around the hinge axes L1 and L2.

In the above-described embodiment, the clips 28 are disposed at two positions in the vehicle front-side edge 20J. Each of the two positions is offset outward from the airbag approach portion 21 in the vehicle-width direction by the predetermined distance. However, the clip 28 may be disposed at one position in the vehicle front-side edge 20J, which is offset outward from the airbag approach portion 21 in the vehicle-width direction. Alternatively, the clips 28 may be disposed at three or more positions in the vehicle front-side edge 20J, each of which is offset outward from the airbag approach portion 21 in the vehicle-width direction.

In the above-described embodiment, each of the hood outer panel 12, the cover 20, and the clip 28 is made of metal. However, the material used to form the hood outer panel 12, the cover 20, and the clip 28 is not limited to metal. Other materials such as resin may be used to form the hood outer panel 12, the cover 20, and the clip 28. Also, the material used to form the hood outer panel 12 may be different from the material used to form the cover 20.

In the above-described embodiment, the hood outer panel 12 is employed as the vehicle-body panel. However, a roof panel and the like may be employed as the vehicle-body panel. Alternatively, other outer panels may be employed as the vehicle-body panel.

The holding means is not limited to the clip 28. Other holding means such as a connection pin may be employed, as long as the holding means holds the cover 20 at such a position that the cover 20 closes the airbag deployment opening 14.

Even in the case where the cover 20 has a straight-line shape in the longitudinal direction, and a plurality of hinge portions pivot around one axis, the center portion and the end portions of the cover 20 in the longitudinal direction may be deformed toward the airbag 73 to a large extent as compared to any other portion of the cover 20 when the cover 20 is opened due to the pressure applied from the airbag 73 that is being deployed. Therefore, in this case as well, at least one clip 28 may be disposed in an area of the vehicle front-side edge 20J of the cover 20 excluding the center portion and the end portions in the longitudinal direction, at least one position between the center portion and at least one of the end portions in the longitudinal direction.

The invention claimed is:

1. An airbag device for a vehicle, comprising:
   an airbag that passes through an elongate opening formed in a hood outer panel, and then is deployed;
   a covering body, which is elongate, and which closes the opening;
   at least two hinge portions that are provided in one peripheral edge of the covering body, which extends along a longitudinal direction of the covering body; and
   a holding portion that holds the covering body at such a position that the covering body closes the opening,
   wherein the at least two hinge portions allow the covering body to be pivoted from its closed position to its open position;
   wherein the holding portion is disposed in another peripheral edge of the covering body, which extends along the longitudinal direction, and which is opposite to the one peripheral edge in which the at least two hinge portions are provided;
   wherein the holding portion is disposed in an area of the other peripheral edge excluding a center portion and end portions in the longitudinal direction, at least one position between the center portion and at least one of the end portions in the longitudinal direction; and
   wherein the at least two hinge portions are arranged with respect to each other such that the respective pivot trajectories of the peripheral edge of the covering body differ such that upon deployment of the airbag the center portion of the covering body is deformed in its opened position toward the top of the vehicle.

2. The airbag device for a vehicle, according to claim 1 wherein the holding portion is disposed at a position distant from an airbag approach portion of the covering body; and wherein a distance between the airbag that is deployed and the airbag approach portion is shorter than a distance between the deployed airbag and any other portion of the covering body in the longitudinal direction, when the covering body pivots around the at least two hinge portions.

3. The airbag device for a vehicle according to claim 2, wherein pivot center axes of the at least two hinge portions are not positioned on one axis, and the pivot center axes cross each other; and the airbag approach portion is a portion that is deformed due to a difference between pivot trajectories of the other peripheral edge of the covering body, which extends along the longitudinal direction.

4. The airbag device for a vehicle according to claim 3, wherein the one peripheral edge, which extends in the longitudinal direction, is bent to have an arc shape.

5. The airbag device for a vehicle according to claim 3, wherein the one peripheral edge, which extends in the longitudinal direction, is bent to have a V-shape.

6. The airbag device for a vehicle according to claim 3, wherein the airbag approach portion is a center portion of the other peripheral edge of the covering body in the longitudinal direction.

7. The airbag device for a vehicle according to claim 3, wherein the pivot center axes of the at least two hinge portions extend along longitudinal directions of the opening and the covering body at both end portions in a vehicle-width direction; and each of the pivot center axes inclines such that an outer portion of each of the pivot center axes in the vehicle-width direction is closer to a rear of a vehicle than is an inner portion of each of the pivot center axes in the vehicle-width direction.

* * * * *